(12) United States Patent
Bammel et al.

(10) Patent No.: US 6,989,411 B2
(45) Date of Patent: Jan. 24, 2006

(54) EPOXY DISPERSIONS FOR USE IN COATINGS

(75) Inventors: Brian D. Bammel, Rochester Hills, MI (US); John D. McGee, Troy, MI (US); Zhiqi Yang, Troy, MI (US)

(73) Assignee: Henkel Kommanditgesellschaft Auf Aktien (Henkel KGaA), Duesseldorf (DE)

( * ) Notice: Subject to any disclaimer, the term of this patent is extended or adjusted under 35 U.S.C. 154(b) by 162 days.

(21) Appl. No.: 10/292,551

(22) Filed: Nov. 12, 2002

(65) Prior Publication Data

US 2003/0149169 A1 Aug. 7, 2003

Related U.S. Application Data

(60) Provisional application No. 60/332,346, filed on Nov. 14, 2001.

(51) Int. Cl.
   C08K 3/20 (2006.01)
   C08L 63/00 (2006.01)
   C08L 63/02 (2006.01)

(52) U.S. Cl. ............... 523/414; 523/403; 523/404; 523/409; 523/415

(58) Field of Classification Search .......... 523/402, 523/403, 404, 414, 409, 415; 525/402, 403, 525/404, 414
See application file for complete search history.

(56) References Cited

U.S. PATENT DOCUMENTS

| | | | |
|---|---|---|---|
| 3,063,877 A | 11/1962 | Shiffman et al. | 148/6.16 |
| 3,585,084 A | 6/1971 | Steinbrecher et al. | 148/6.2 |
| 3,592,699 A | 7/1971 | Steinbrecher et al. | 148/6.2 |
| 3,709,743 A | 1/1973 | Dalton et al. | 148/6.2 |
| 3,791,431 A | 2/1974 | Hall et al. | 148/6.2 |
| 3,795,546 A | 3/1974 | Hall et al. | 148/6.2 |
| 4,028,294 A | 6/1977 | Brown et al. | |
| 4,030,945 A | 6/1977 | Hall et al. | 148/6.2 |
| 4,108,817 A | 8/1978 | Lochel, Jr. | |
| 4,178,400 A | 12/1979 | Lochel, Jr. | 427/435 |
| 4,180,603 A | 12/1979 | Howell, Jr. | 427/353 |
| 4,186,226 A | 1/1980 | Smith | 427/340 |
| 4,212,781 A | 7/1980 | Evans et al. | 260/29.4 |
| 4,234,704 A | 11/1980 | Sakanaka et al. | 525/215 |
| 4,242,379 A | 12/1980 | Hall et al. | 427/327 |
| 4,285,847 A | 8/1981 | Ting | 260/29.2 |
| 4,289,826 A | 9/1981 | Howell, Jr. | 428/418 |
| 4,308,185 A | 12/1981 | Evans et al. | 260/29.2 |
| 4,399,241 A | 8/1983 | Ting et al. | 523/400 |
| 4,442,246 A | 4/1984 | Brown et al. | 523/404 |
| 4,443,568 A | 4/1984 | Woo | 523/406 |
| 4,482,671 A | 11/1984 | Woo et al. | 525/31 |
| 4,482,673 A | 11/1984 | Brown et al. | 525/119 |
| 4,487,859 A | 12/1984 | Martino | 523/100 |
| 4,487,860 A | 12/1984 | Winner et al. | 523/408 |
| 4,487,861 A | 12/1984 | Winner | 523/428 |
| 4,503,173 A | 3/1985 | Martino et al. | 523/407 |
| 4,522,961 A | 6/1985 | Martino et al. | 523/407 |
| 4,522,962 A | 6/1985 | Abbey et al. | 523/410 |
| 4,547,535 A | 10/1985 | Brown et al. | 523/404 |
| 4,612,209 A | 9/1986 | Forgó et al. | 427/54.1 |
| 4,636,264 A | 1/1987 | Schellenberg et al. | 148/6.2 |
| 4,636,265 A | 1/1987 | Fischer et al. | 148/6.15 R |
| 4,800,106 A | 1/1989 | Broadbent | 427/388.1 |
| 4,859,721 A | 8/1989 | Oberkobusch et al. | 523/402 |
| 4,874,673 A | 10/1989 | Donovan et al. | 428/463 |
| 5,177,122 A | 1/1993 | Shih | 523/201 |
| 5,252,637 A | 10/1993 | Craun et al. | 523/406 |
| 5,342,694 A | 8/1994 | Ahmed et al. | 428/461 |
| 5,500,460 A | 3/1996 | Ahmed et al. | 523/402 |
| 5,708,058 A | 1/1998 | Pfeil et al. | 523/403 |
| 6,096,806 A | 8/2000 | Mueller et al. | 523/402 |
| 6,410,092 B1 | 6/2002 | Yang et al. | 427/340 |

FOREIGN PATENT DOCUMENTS

| | | |
|---|---|---|
| CA | 2 186 424 | 9/1996 |
| EP | 770 635 | 9/1996 |
| EP | 933384 | 1/1999 |
| WO | WO 00/71337 | 5/2000 |

*Primary Examiner*—Robert Sellers
(74) *Attorney, Agent, or Firm*—Connolly Bove Lodge & Hutz LLP

(57) ABSTRACT

Epoxy resins that have one or more functional groups that impart an anionic character to the epoxy resins are prepared. The resulting anionic functionalized epoxy resins may be used to produce high solids, epoxy-based dispersions that are capable of being used as a component of a coating bath which can provide to a coating that may be applied to a surface using a variety of techniques.

12 Claims, No Drawings

EPOXY DISPERSIONS FOR USE IN COATINGS

Priority is claimed under 35 USC §119(e) from U.S. Provisional Application Ser. No. 60/332,346 filed Nov. 14, 2001; the entirety of which is herein incorporated by reference.

FIELD OF THE INVENTION

The present invention relates generally to epoxy emulsions providing corrosion resistant films and to a method of making high solids, epoxy-based coating materials, more particularly to epoxy emulsions having anionic functionality which provide a means of manufacturing corrosion resistant films.

BACKGROUND OF THE INVENTION

Autodeposition has been in commercial use on steel for about thirty years and is now well established for that use. For details, see for example, U.S. Pat. Nos. 3,063,877; 3,585,084; 3,592,699; 3,674,567; 3,791,431; 3,795,546; 4,030,945; 4,108,817; 4,178,400; 4,186,226; 4,242,379; 4,234,704; 4,636,264; 4,636,265; 4,800,106; and 5,342,694. The disclosures of all these patents are hereby incorporated by reference. Epoxy resin-based autodeposition coating systems are described in U.S. Pat. No. 4,180,603 (Howell. Jr.); U.S. Pat. No. 4,289,826 (Howell Jr.); U.S. Pat. No. 5,500,460 (Ahmed et al.); U.S. Pat. No. 6,096,806 (Mueller et al.) and International Publication Number WO 00/71337, the teachings of each of which are incorporated by reference.

Autodeposition compositions are usually in the form of a liquid, usually aqueous solutions, emulsions or dispersions in which active metal surfaces of inserted objects are coated with an adherent resin or polymer film that increases in thickness the longer the metal remains in the bath, even though the liquid is stable for a long time against spontaneous precipitation or flocculation of any resin or polymer, in the absence of contact with the active metal. When used in the autodeposition process, the composition when cured forms a polymeric coating. "Active metal" is defined as metal that spontaneously begins to dissolve at a substantial rate when introduced into the liquid solution or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods or a like term. Autodeposition is often contrasted with electrodeposition. Although each can produce adherent films with similar performance characterisitics, the dispersions from which they are produced and the mechanism by which they deposit are distinctly different. Electrodeposition requires that metal or other objects to be coated be connected to a source of direct current electricity for coating to occur. No such external electric current is used in autodeposition.

Prior epoxy emulsions used for autodeposition application are generally made by blending an epoxy functional resin(s) in a solvent. The epoxy resin may be blended with other coating components and additives such as crosslinking agents and/or coalescing solvents. The resulting solvent solution is then emulsified, with surfactants, in water and stripped of solvent to give a dispersion of resinous particles dispersed in water. This dispersion may then be used as a component of a coating bath. The dispersion, when autodeposited on a metal surface and cured, forms a polymeric coating.

All previous epoxy-coating compositions have relied on an emulsifier(s), usually in the form of external surfactant(s), to form stable emulsions of resinous particles in water. Epoxy coating compositions based on this approach are expensive to manufacture because of the amount of solvent used and time required to strip the emulsified material. Large amounts of external surfactants can also lead to deleterious effects in the cured coating caused by the ionic character of small surfactant molecules and due to the ability of the surfactant molecules to migrate in the coating.

Thus, there is a need in the art for high solids, epoxy-based autophoretic coating materials that reduce or minimize the need for process solvents that adversely affect manufacturing costs. There is also a need in the art for a means to obtain the high solids, epoxy-based autodepositing coating materials that eliminate and/or minimize the need for external emulsifier, thereby eliminating or reducing the deleterious effects in the cured coating caused by the ionic character of small surfactant molecules and due to the ability of the surfactant molecules to migrate in the coating.

SUMMARY OF THE INVENTION

The present invention solves the problems of the related art by providing a means to obtain dispersions with smaller particle sizes using less solvent and resulting in improved coating bath stability. Using less solvent has the advantage of improved process yield and economics associated with the manufacture of dispersions. The invention also provides for a dispersion having no, or a greatly reduced amount of, external surfactant. Therefore, the deleterious effects of small surfactant molecule migration in the final coating are eliminated or reduced. The invention also produces high solids epoxy-based dispersions that are capable of being used as a primary material that forms a coating film or as an additive component of a coating formulation that enhances the properties provided by the paint film. The invention provides a coating that may be applied using a variety of techniques such as autodeposition, spray, electrostatic, roll, and brush application. The present invention results in dispersions that are stable and autodeposit a coating in an Autophoretic® bath environment.

Typical film properties include good anti-corrosive properties; good humidity, moisture and chemical resistance; and good appearance.

In accordance with the purpose of the invention, as embodied and broadly described herein, the invention comprises a process of making an epoxy resin dispersion, the process comprising the steps of: (a) mixing at least one anionic functionalized epoxy resin with at least one solvent to form a mixture, wherein the at least one anionic functionalized epoxy resin is derived from one or more epoxy resins having a molecular weight of at least about 2000 Daltons; and (b) dispersing the mixture of step (a) in water.

Further in accordance with the purpose of the invention, as embodied and broadly described herein, the invention comprises an autodepositing epoxy resin dispersion comprising: (a) water; and (b) at least one anionic functionalized epoxy resin in dispersed form, wherein the at least one anionic functionalized epoxy resin was derived from one or more epoxy resins having a molecular weight of at least about 2000 Daltons.

Still further in accordance with the purpose of the invention, as embodied and broadly described herein, the invention comprises an autodepositing coating composition comprising: (a) at least one autodepositing epoxy resin dispersion described immediately above; (b) water; and (c) at least one autodeposition accelerator.

Still further in accordance with the purpose of the invention, as embodied and broadly described herein, the invention comprises a process of making an autodepositing epoxy resin dispersion the process comprising the steps of: (a) mixing at least one anionic functionalized epoxy resin with at least one solvent to form a mixture, wherein the at least one anionic functionalized epoxy resin is derived from one or more epoxy resins conforming to the general chemical structure:

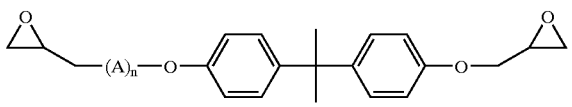

wherein A is

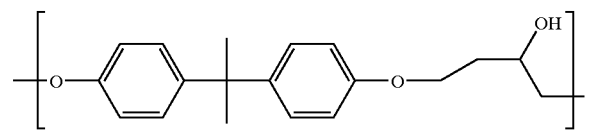

and n is an integer from 7 to 50; and (b) dispersing the mixture of step (a) in water.

Still further in accordance in accordance with the purpose of the invention, as embodied and broadly described herein, the invention comprises an autodepositing epoxy resin dispersion comprising: (a) water; and (b) at least one anionic functionalized epoxy resin in dispersed form, wherein the at least one anionic functionalized epoxy resin is derived from one or more epoxy resins conforming to the general chemical structure:

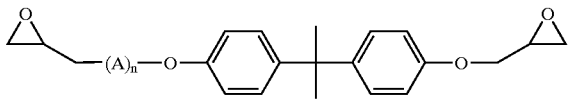

wherein A is

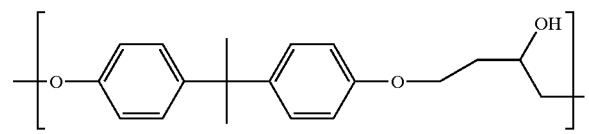

and n is an integer from 7 to 50. The invention also comprises an autodepositing coating composition comprising (a) at least one autodepositing epoxy resin dispersion described immediately above; (b) water; and (c) at least one autodeposition accelerator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

DETAILED DESCRIPTION OF THE PREFERRED EMBODIMENTS

The following detailed description does not limit the invention. Instead, the scope of the invention is defined by the appended claims and equivalents thereof.

The anionic functionalized epoxy resins useful in the present invention can be derived from conventional epoxy resins. Such epoxy resins are well known substances and are described, for example, in the chapter entitled "Epoxy Resins" in Volume 6 of The Encyclopedia of Polymer Science and Engineering (Second Edition).

Epoxy resins are often described by the type of central organic moiety or moieties to which the 1,2-epoxy moieties are attached. Non-exclusive examples of such central moieties are those derived from bisphenol A, bisphenol F; novolak condensates of formaldehyde with phenol and substituted phenols, the condensates containing at least two aromatic nuclei; triazine; hydantoin; and other organic molecules containing at least two hydroxyl moieties each, in each instance with as many hydrogen atoms deleted from hydroxy moieties in the parent molecule as there are epoxy moieties in the molecules of epoxy resin. Optionally, the 1,2-epoxide moieties may be separated from the central moieties as defined above by one or more methylene groups. Oligomers of such monomers, either with themselves or with other organic molecules containing at least two hydroxyl moieties each, may also serve as the central organic moiety.

Epoxy resins useful as starting materials for the present invention include glycidyl ethers of a polyhydric phenol, such as bisphenol A (a preferred species of polyhydric phenol), bisphenol F, bisphenol AD, catechol, resorcinol, and the like.

These lower molecular weight epoxy resin molecules may be reacted to form epoxy resins that are higher in average molecular weight than the starting epoxy resin(s). In one embodiment, these higher molecular weight epoxy resins have an average molecular weight greater than about 2000 Daltons. In another embodiment higher molecular weight epoxy resins are not required if the anionic functional groups that impart the anionic character to the anionic functionalized epoxy resin are functional groups other than carboxylate functional groups.

In one embodiment a chain extender is utilized to react individual epoxy resin molecules through their epoxy groups so as to form an epoxy resin that is higher in average molecular weight than the starting epoxy resin(s). Useful starting materials to prepare the resin component of the present invention are chain-extended epoxy resins, such as those described in copending application Ser. No. 09/578, 935, filed on May 25, 2000, and corresponding to published International application WO 00/71337, the disclosure of which is herein incorporated by reference in its entirety. In chain-extended resins, a chain extender is utilized to react individual epoxy resin molecules through their epoxy groups so as to form a polymer that is higher in average molecular weight than the starting epoxy resin(s). In one embodiment, after chain extension, the epoxy resins have an average molecular weight greater than about 2000 Daltons. In another embodiment an average molecular weight greater than about 2000 Daltons is not required if the anionic functional groups that impart the anionic character to the anionic functionalized epoxy resin are functional groups other than carboxylate functional groups. Glycidyl ethers of bisphenol A are particularly preferred for use as the starting epoxy resin. For reasons that are not well understood, "prereacting" the epoxy resin(s) in this manner leads to improvements in the quality and performance of the final autodeposited coating as compared to simply using a dispersion of the epoxy resin(s) in unreacted form. This is particularly true where at least one of the epoxy resins is a flexibilizing epoxy resin.

A "flexibilizing epoxy resin" may be defined as an epoxy resin which when cured by itself with diethylene triamine (DETA) has a durometer Shore D reading not greater than 45. Suitable flexibilizing epoxy resins include those compounds containing at least one epoxide group per molecule and one or more groups capable of increasing the flexibility of the cured autodeposited coating such as, for example, long aliphatic chains (e.g., polymethylene chains corresponding, for example, to the structure —$(CH_2)_n$— wherein "n" is preferably greater than 3, more preferably greater than 6. The polymethylene chains can be in the backbone of the flexibilizing epoxy resin and/or pendent thereto), polyester chains (especially those formed by condensation of aliphatic diacids and glycols or glycol oligomers), polyoxyalkylene chains (e.g., polyether chains corresponding to the structure $((CH_2)n\text{-}CHR\text{—}O\text{—})m\text{-}$, where "n" is 0–3, "m" is 2 or greater, and R is H or alkyl), and the like. A particularly preferred flexibilizing epoxy resin is a difunctional epoxy derived from cardanol (a phenol substituted with a long chain unsaturated hydrocarbon group which is obtained from cashew nut oil) having an epoxy equivalent weight of about 350.

In one embodiment of the invention, the average molecular weight is increased through chain extension at least about 100%, more preferably at least about 200%, relative to the initial average molecular weight of the starting epoxy resin or combination of epoxy resins. The chain extender thus should contain at least two functional groups capable of reacting with said epoxy group such as, for example, hydroxy, carboxylic acid, carboxylic acid anhydride or the like. In one embodiment of the invention, the chain extender is a polyhydric phenol such as bisphenol A. Alkoxylated polyhydric phenols such as SYNFAC 8009 (available from Milliken Chemical) may also be used as chain extenders. Suitable chain extenders additionally include dicarboxylic acids such as adipic acid.

In one embodiment of the invention a diglycidyl ether of a polyhydric phenol such as bisphenol A is used in combination with a chain extender which contains one or more flexibilizing segments such as polymethylene, polyester or polyoxyalkylene segments. For example, a polyether polyol such as polypropylene glycol, polyester polyol (hydroxy and/or carboxylic acid terminated), dimer fatty acid, long chain dicarboxylic acid (e.g., decanedioic acid), long chain diol (e.g. 1,12-decanediol), or the like could be used.

The stoichiometry of chain extender(s) to epoxy resin(s) is adjusted depending upon the degree of condensation (i.e., chain extension) desired in the reaction product that is to be used as the resin component in the autodeposition coating of the present invention. Typically, however, the amount of epoxy resin(s) is kept in slight to moderate excess relative to the amount of chain extender(s). For example, the equivalents of epoxy groups in the epoxy resin(s) may be about 5% to about 50% greater than the equivalents of active hydrogen groups in the chain extender(s). The reaction product formed thus will contain unreacted epoxy groups (i.e., the reaction product will be epoxy-functionalized). The reaction product will also contain hydroxy (—OH) groups, which maybe present in the initial epoxy resin(s) or which may be formed as a consequence of the reaction between the chain extender and the epoxy groups of the epoxy resin.

The epoxy resin(s) and chain extender(s) are reacted for a time and at a temperature effective to cause the desired degree of condensation and chain extension. Such conditions will vary depending upon the relative reactivities of the components and other factors, but may be optimized without undue experimentation.

Catalysts capable of accelerating the desired epoxy group reaction with the chain extender such as phosphines, amines, quaternary ammonium salts, quaternary phosphonium salts, and other basic substances may be utilized if so desired in order to reduce the reaction time and/or temperature required. The reaction may be carried out in the presence of a solvent capable of dissolving both the epoxy resin(s) and the chain extender(s) such as, for example, an inert organic solvent (e.g., aromatic hydrocarbons, ketones). It is recognized that in certain embodiments of the invention, some portions of the starting materials may remain unreacted and thus may be present in such form when the reaction product is used in the autodeposition composition described herein.

In another embodiment, it is generally preferred to utilize epoxy resins derived from bisphenol A in this invention. More particularly, epoxy moiety containing molecules utilized in this invention preferably conform to the general formula:

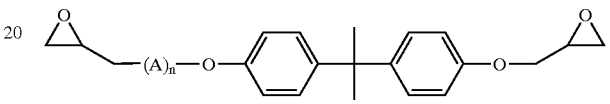

where A=

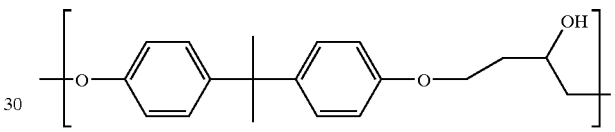

and "n" is an integer from 7 to 50. If such epoxy resins are to be used directly as the resin component of the present invention, n is preferably an integer within the range from 7–30 so that each molecule contains at least one hydroxyl group. Commercially available epoxy resins of this type are normally mixtures of molecules having somewhat different n values and different numbers of epoxy groups. Preferably, the epoxy resin mixture used has a number average molecular weight in the range of from about 2328 to about 5,000 Daltons, or in the range from about 2328 to about 3000 Daltons. Preferably, the average number of epoxide groups per molecule in the epoxy resin mixture is in the range from 1.7 to 2.5, more preferably in the range from 1.9 to 2.1.

In another embodiment "n" is an integer from 0 to 50 if the anionic functional groups that impart the anionic character to the anionic functionalized epoxy resin epoxy resin are functional groups other than carboxylate functional groups. In such an embodiment if such epoxy resins are to be used directly as the resin component of the present invention, n is preferably an integer within the range from about 1–30 so that each molecule contains at least one hydroxyl group. Commercially available epoxy resins of this type are normally mixtures of molecules having somewhat different n values and different numbers of epoxy groups. Preferably, the epoxy resin mixture used has a number average molecular weight in the range of from about 350 to about 5,000, more preferably in the range from about 400 to about 3000. Preferably, the average number of epoxide groups per molecule in the epoxy resin mixture is in the range from 1.7 to 2.5, more preferably in the range from 1.9 to 2.1. The epoxy resin mixture may contain resin molecules in which n=0.

Anionic functionalized epoxy resin refers to an epoxy resin that has one or more functional groups that impart an anionic character to the epoxy resin. Examples of classes of anionic functional groups include sulfonate, sulfate, phosphate, phosphonate, and carboxylate. While not wishing to be bound by this theory, it is felt that the introduction of anionic functionality onto the resin(s) results in a self-dispersing characteristic that improves dispersion formation characteristics. Less solvent is therefore needed to reach a target particle size. The amount of external emulsifier (e.g. surfactant) needed to achieve a stable dispersion may also be reduced.

Anionic functional groups may be introduced into epoxy resin molecules in a number of different ways. Typically, epoxy resins will contain hydroxy groups as well as epoxy groups. These groups may be reacted with various reagents bearing the desired anionic functional group or a precursor thereof. In one embodiment, the starting epoxy resin is reacted with a dicarboxylic acid such as adipic acid. Without wishing to be bound by theory, it is believed that one carboxylic acid group reacts with an epoxy group of the epoxy resin to form an ester linkage. The other carboxylic acid group of the dicarboxylic acid is subsequently converted to a salt using a base such as ammonium hydroxide to provide the anionic functionalized epoxy resin. In this embodiment, it will typically be desired to control the ratio of dicarboxylic acid to starting epoxy resin and the reaction conditions such that the reaction product obtained still contains residual epoxy groups. A catalyst may be used to promote the esterification reaction.

Esterification reactions using compounds containing both carboxylic acid groups (or carboxylic acid ester groups) and phosphate, sulfate, and/or sulfonate functional groups may also be carried out.

Another means to add anionic functional groups to the expoxy resin is to react the epoxy resin with a functionalizing agent containing at least one anionic functional group (or a precursor thereof) and at least one functional group capable of reacting with epoxy groups and/or hydroxyl groups (where the epoxy resin being reacted contains hydroxyl groups). Non-exclusive examples of such functionalizing agents include compounds containing sulfonate functionality or carboxylate functionality as well as phenol (aromatic hydroxyl) functionality. The alkali metal salts of hydroxybenzenesulfonic acid and hydroxybenzoic acid are representative compounds of this type. The reaction must be carried out in a solvent which will solubilize the epoxy resin and functionalizing agent. A catalyst may be used to promote or accelerate the reaction between the epoxy resin and the functionalizing agent. Non-exclusive examples of such catalysts capable of accelerating or promoting the desired reaction with the functionalizing agent include phosphines, amines, quaternary ammonium salts, quaternary phosphonium salts, and other basic substances. For example, when hydroxybenzenesulfonic acid is used as a functionalizing agent, a basic compound such as phosphine may be used to catalyze the desired functionalization reaction.

Alternatively, the starting epoxy resin may be derivatized by reaction with phosphorylating, sulfating, or sulfonating reagents such as superphosphoric acid, sulfuric acid, and the like.

In one embodiment the preferred starting epoxy resin materials for the functionalization reaction are higher molecular weight epoxy resins having an average molecular weight greater than about 2000 Daltons. In another embodiment, the preferred starting epoxy resin materials for the functionalization reaction conform to the general formula:

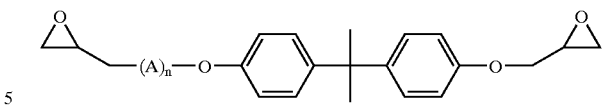

where A=

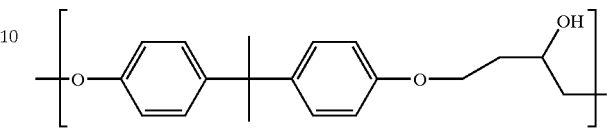

and "n" is an integer from 7 to 50.

In one embodiment of the invention, the reaction product derived from the epoxy resin(s) and any chain extenders(s) is prepared prior to forming a dispersion of said reaction product in water. The reaction product is then functionalized with anionic functionality resulting in an anionic functionalized epoxy resin. A solution of the anionic functionalized epoxy in one or more organic solvents is dispersed with water, optionally in the presence of one or more emulsifiers, to form an organic solvent-containing intermediate dispersion. Other desired components such as cross-linkers, coalescing agents, flow control additives (leveling agents), and the like may also be incorporated into the dispersion, either as components predissolved in the organic (solvent) phase or added separately to the dispersion. Preferably, the organic solvent is subsequently removed from the dispersion by distillation or similar method.

Acrylic resins may also be used as a component in the coatings of the present invention. The acrylic resins are either blended prior to dispersion or are blended as an aqueous dispersion with the epoxy dispersion. The acrylic resins employed as a component may be generally described as polymeric substances obtained by polymerization of one or more acrylic monomers, possibly in combination with one or more non-acrylic monomers, which provide a stable (e.g. non-coagulating) autodeposition bath and yet are capable of forming an autodeposition adherent film comprised of the acrylic resin on the surface of an active metal when placed in contact with the surface in the presence of an autodeposition accelerator. Non-exclusive examples of suitable acrylic monomers include acrylic acid, methacrylic acid, esters of acrylic acid and methacrylic acid (especially $C_1$–$C_8$ alkyl esters), acrylonitrile, methacrylonitrile, acrylamide, methacrylamide, and the like. Non-exclusive examples of non-acrylic monomers which may be copolymerized with the acrylic monomer(s) include vinyl aromatic monomers, polymerizable ethylenically monounsaturated monomers, hydroxy group-containing polymerizable unsaturated vinyl monomers, polymerizable vinylenically polyunsaturated monomers, vinyl esters of carboxylic acids such as vinyl acetate, and the like. Preferably, the acrylic resin selected for use is in dispersed or latex form (i.e., fine particles stably dispersed in an aqueous medium).

Suitable acrylic resins may be readily obtained from commercial sources, with especially preferred resins including MAINCOTE TL-5 and MAINCOTE AE-58 (both products of Rohm and Hass), AQUAMAC 705 (a product of McWhorter), RHOPLEX WL-91, B-85, and 1822 (products of Rohm and Haas), NEOCRYL A633, A621, and A640 (products of Zeneca), NACRYLIC 78-361, 78-6408, 78-3936 and 78-6334 (products of National Starch & Chemical Co.) and 76 Resin 1018 and 6033 (products of Unocal). MAINCOTE TL-5 is preferred. Other suitable resins may be readily identified by running autodeposition tests using a candidate resin to determine if that resin a) forms a stable autodeposition bath, b) coats onto the surface of an active metal in the presence of an autodeposition accelerator and c) provides an adherent wet film that is not readily rinsed from the active metal surface.

Less preferred acrylic resins include RHOPLEX 1950, AC-64, TR 407, HA-8, HA-12, and B-60A (products of Rohm and Haas), CMD-9790 (a product of Hi-Tek), NACRYLIC 78-6354 and 78-6207 (products of Zeneca), 76 Resin 6510, Z6106, ST 6004, and VC 60012 (products of Unocal), and SACI RP-215A (a product of Witco Chemical).

A solvent component may be used as a medium for combining the starting epoxy resin and/or anionic functionalized epoxy resin and any added components. Solvent, for the purposes of the present application, includes any suitable solvent other than water. The epoxy resin and/or anionic functionalized epoxy resin and any added components may be dissolved in the solvent and the resulting solution dispersed in water. The solvent component may be removed from the dispersion by conventional means. For example, the solvent component may be removed from the dispersion by distillation under reduced pressure to yield an epoxy resin dispersion (i.e., fine particles comprised of epoxy resin and/or anionic functionalized epoxy resin and other components dispersed in an aqueous medium). The solvent, in many cases, does not diminish the technical benefits of the final coating composition and may be left in place when the dispersion is added as a component of the final coating composition. Any residual solvent will normally be expelled during the elevated temperatures found in the curing stage at the end of the coating process. The solvent component is not believed in most cases to contribute any desirable characteristics to the final coating compositions although it may function as a coalescing agent in some instances. However, in many cases, the preferred solvents are not particularly effective coalescing agents when used alone.

Any solvent capable of dissolving the epoxy resin/anionic functionalized epoxy resin can be selected. The most preferred solvents are mixtures of (i) aromatic hydrocarbons having 6 to 10 carbon atoms and (ii) ketones having 3 to 8 carbon atoms. Preferably, the amount of solvent used to mix the materials is less than about 50 wt % of the combined weight of the components without water. The most preferred solvents are toluene and methyl isobutyl ketone (MIBK).

An dispersing or emulsifying agent, such as a surfactant, may need to be used to further or aid in the formation of the dispersion of epoxy resin and/or anionic functionalized epoxy resin and any added components in water. Preferably, however, no external dispersing or emulsifying agent is present, or the amount of external dispersing or emulsifying agent is minimized in order to avoid the problems caused by residual dispersing or emulsifying agent in the cured coating. Anionic surfactants are generally preferred, although amphoteric as well as nonionic surfactants may also be utilized. Combinations and mixtures of different surfactants may be employed. Preferred anionic surfactants for use in the present invention are ether sulfates that conform to general formula:

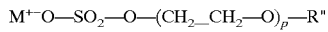

wherein:
M represents a monovalent cation or monovalent fraction of cation of higher valence, preferably, sodium or ammonium, more preferably ammonium;
p is a positive integer that preferably is at least, with increasing preference in the order given, 2, 3 or 4; and R" represents an alkyl or alkylaryl moiety, more preferably an alkyl phenol moiety. R" has 8–30, preferably 15–20, carbon atoms. Suitable commercially available anionic emulsifiers include Dowfax™ 2A-1 (sodium salt of alkylated diphenyl oxide disulfonate); Abex™ 26-5; Texapon™ E-12 and K-12; Rhodapex™ CO-128, -433, and -436 and EP-100, -110, -115, -120, and -227; Disponsil™ AES-13, and Aerosol™ OT (sodium dioctylsulfosuccinate).

The single most preferred anionic dispersing or emulsifying agent is Rhodapex™ CO-436, which is reported by its supplier to be an ammonium salt of sulfated nonylphenol ethoxylate and to contain 60% of this active ingredient. The preferred amount of active anionic dispersing or emulsifying agent is less than about 2.5 wt % based on total composition and is preferably from about 0.5 to about 2.0 wt %.

The epoxy resin dispersions and coating compositions of the present invention may also contain one or more substances capable of reacting with the epoxy resin and/or anionic functionalized epoxy resin to provide a crosslinked polymeric matrix in the cured coating. In an embodiment of the invention, at least a portion of curing agents only react with the epoxy resin and/or anionic functionalized epoxy resin component at the elevated temperatures typically encountered during the curing stage of the composition (e.g., temperatures greater than 100° C.). Such curing agents are often referred to in the art as "latent" curing agents or hardeners because they only become activated when heated to a temperature well in excess of normal room temperature. The use of latent curing agents is preferred in the present invention so that substantial cross linking of the epoxy resin and/or anionic functionalized epoxy resin may be avoided prior to and during deposition on the surface of an article. In the case of metallic articles the deposition is typically carried out at temperatures of from about 20° C. to about 60° C. However, if so desired, minor amounts of more reactive curing agents may also be present in addition to the latent curing agents so as to accomplish partial crosslinking prior to deposition on an article.

The preferred curing agents are generally selected so as to be capable of reacting with the hydroxyl groups and/or intact epoxide groups, which are present in the epoxy resin and/or anionic functionalized epoxy resin component. Hydroxyl groups are inherent to epoxy resins as hydroxyl is formed upon ring opening of the epoxide, independent of whether this ring opening occurs in the advancement of the epoxy resin, during anionic functionalization of the epoxy resin, or by reaction of residual epoxy with acids such as HF in the coating bath.

Examples of suitable curing agents include (a) molecules that contain: at least two epoxy and/or hydroxyl-reactive functional groups, such as amine, amide, imine, thiol, hydroxyl, carboxyl, and carboxylic acid anhydride, and (b) molecules that contain at least two blocked isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating to a temperature in excess of 100° C. Examples of such blocked isocyanates are described in U.S. Pat. Nos. 5,500,460 and 6,096,806, the disclosures of which are herein incorporated by reference in their entirety.

Briefly described, the blocked isocyanates of U.S. Pat. Nos. 5,500,460 and 6,096,806 are chosen from molecules that conform to general formula:

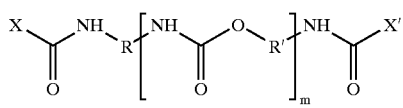

wherein:
each of X and X' independently is a monovalent moiety formed by removing the most easily ionized hydrogen atom from an amine, alcohol, amide, or oxime molecule, or X and X' are joined to each other to form a uretdione;
each of R and R' independently is a divalent hydrocarbon or carbonyl hydrocarbon moiety derived by removing from any hydrocarbon, or from an oxyhydrocarbon in which all oxygen atoms present are in carbonyl groups, any two hydrogen atoms not attached to the same carbon atom, said divalent hydrogen or carbonyl-hydrocarbon moiety having from 2 to 20 carbon atoms and having no unsaturation except aromatic and carbonyl unsaturation; and
m is an integer from 0–20, preferably 1–15.

The blocking groups X and X', which preferably are the same or are joined to form a uretdione, can be derived from any suitable aliphatic, cycloaliphatic, aromatic, or alkylaromatic monoalcohol, monoamide, monoamine, or monooxime. Use of ketoximes is widely known in the art when unblocking at relatively low temperatures such as 120° C. is desired. More sterically hindered and/or more acid stable blocking groups, such as those derived from the lactam of 6-aminohexanoic acid and/or benzotriazole are preferred if unblocking is desired to begin at a substantial rate only at or above 160° C.

The use of isophorone diisocyanate-based, epsilon-caprolactam blocked isocyanates as a crosslinking agent, such as the product sold by Huels under the trademark VESTAGON B1530, is particularly preferred. If a blocked isocyanate-type crosslinker is utilized, the ratio of blocked isocyanate groups to hydroxy groups (NCO:OH) typically will be from about 0.05 to about 1.2, more preferably from about 0.1 to about 0.5. Other examples include blocked hexamethylene diisocyanates (HMDI). In one embodiment of the invention, the epoxy curing agent and epoxy resin and/or anionic fuctionalized epoxy resin are contained in the same molecule. Blocked isocyanate-bearing epoxy resins are described, for example, in U.S. Pat. No. 4,859,721 and co-pending U.S. application Ser. No. 09/944,267, filed Aug. 31, 2001, each of which is incorporated herein by reference in its entirety.

Generally, the presence of a coalescing agent component in an epoxy resin dispersion or coating composition is preferred. Coalescing agents will be apparent to those skilled in the art. Non-exclusive examples of coalescing agents include monoethers and monoesters of glycols, preferably glycols with at least one terminal hydroxy group. Monoethers of ethylene glycol are readily available. Monoethers of propylene glycol, particularly the methyl, t-butyl, n-butyl, and phenol monoethers of propylene glycol, dipropylene glycol and tripropylene glycol are preferred from this class.

Dispersion may take place by emulsification. Emulsification may be accomplished by any of the emulsification procedures known in the art. In one embodiment, mechanical means are used to reduce particle size such that the dispersion is phase stable over time. In another embodiment, the procedures described in U.S. Pat. No. 6,096,806 are followed. These procedures, which are hereby incorporated by reference, involve a two stage process in which a solution of the polymer in a suitable solvent such as an aromatic hydrocarbon (especially those containing 6 to 10 carbon atoms such as toluene) and/or an aliphatic ketone (especially those containing 3 to 8 carbon atoms such as methyl isobutyl ketone) is emulsified into water to form a preliminary dispersion and the preliminary dispersion is subjected to at least one particle size refinement stage.

Following dispersion, it will generally be desirable to remove any organic solvent(s) present by an appropriate means such as, for example, distillation. Where the polymer is a solid at 25° C., solvent removal will normally result in the formation of a dispersion (i.e., solid particles of polymer dispersed in water). The temperature during distillation should be controlled in order to avoid premature curing or cross-linking of the polymer by the cross-linker. The distillation may be conducted under reduced pressure if the normal boiling point of the solvent to be removed is higher than the desired distillation temperature. The solvent removal conditions are also preferably selected such that the organic solvent(s), but not the coalescing agent(s), are separated from the dispersion. For this reason, it will be desirable to use a solvent which has a boiling point (or an azeotropic boiling point with water) which is lower than the boiling point(s) of the coalescing agent(s). Alternatively, the organic solvent component of the dispersion may be left in when the dispersion is used in an autodeposition coating process and any solvent remaining in the wet coating may be removed during the curing step.

To prepare a bath composition suitable for coating a metallic substrate by autodeposition, the aforedescribed emulsion or epoxy resin dispersion is combined with an autodeposition accelerator component which is capable of causing the dissolution of active metals (e.g., iron) from the surface of the metallic substrate in contact with the bath composition. Preferably, the amount of accelerator present is sufficient to dissolve at least about 0.020 gram equivalent weight of metal ions per hour per square decimeter of contacted surface at a temperature of 20° C. Preferably, the accelerator(s) are utilized in a concentration effective to impart to the bath composition an oxidation-reduction potential that is at least 100 millivolts more oxidizing than a standard hydrogen electrode. Such accelerators are well-known in the autodeposition coating field and include, for example, substances such as an acid, oxidizing agent, and/or complexing agent capable of causing the dissolution of active metals from active metal surfaces in contact with an autodeposition composition. The autodeposition accelerator component may be chosen from the group consisting of hydrofluoric acid and its salts, fluosilicic acid and its salts, fluotitanic acid and its salts, ferric ions, acetic acid, phosphoric acid, sulfuric acid, nitric acid, hydrogen peroxide, peroxy acids, citric acid and its salts, and tartaric acid and its salts. More preferably, the accelerator comprises: (a) a total amount of fluoride ions of at least 0.4 g/L, (b) an amount of dissolved trivalent iron atoms that is at least 0.003 g/L, (c) a source of hydrogen ions in an amount sufficient to impart to the autodeposition composition a pH that is at least 1.6 and not more than about 5, and, optionally, (d) hydrogen peroxide. Hydrofluoric acid is preferred as a source for both the fluoride ions as well as the proper pH. Ferric fluoride can supply both fluoride ions as well as dissolved trivalent iron. Accelerators comprised of HF and $FeF_3$ are especially preferred for use in the present invention.

In one embodiment, ferric cations, hydrofluoric acid, and hydrogen peroxide are all used to constitute the autodeposition accelerator component. In a working composition according to the invention, independently for each constituent: the concentration of ferric cations preferably is at least, with increasing preference in the order given, 0.5, 0.8 or 1.0 g/l and independently preferably is not more than, with increasing preference in the order given, 2.95, 2.90, 2.85, or 2.75 g/l; the concentration of fluorine in anions preferably is at least, with increasing preference in the order given, 0.5, 0.8, 1.0, 1.2, 1.4, 1.5, 1.55, or 1.60 g/l and independently is not more than, with increasing preference in the order given, 10, 7, 5, 4, or 3 g/l; and the amount of hydrogen peroxide added to the freshly prepared working composition is at least, with increasing preference in the order given, 0.05, 0.1, 0.2, 0.3, or 0.4 g/l and independently preferably is not more than, with increasing preference in the order given, 2.1, 1.8, 1.5, 1.2, 1.0, 0.9, or 0.8 g/l.

A dispersion or coating bath composition of the present invention may also contain a number of additional ingredients that are added before, during, or after the formation of the dispersion. Such additional ingredients include fillers, biocides, foam control agents, pigments and soluble colorants, and flow control or leveling agents. Unreacted epoxy resin (i.e., epoxy resin which does not contain anionic functional groups) may also be present, as may resins and polymers other than epoxy-type or epoxy-based resins. The compositions of these various components may be selected in accordance with the concentrations of corresponding components used in conventional epoxy resin-based autodeposition compositions, such as those described in U.S. Pat. Nos. 5,500,460, and 6,096,806 and U.S. Ser. No. 09/578,935.

Suitable flow control additives or leveling agents include, for example, the acrylic (polyacrylate) substances known in the coatings art, such as the products sold under the trademark MODAFLOW® by Soultia, as well as other leveling agents such as BYK-310 (from BYK-Chemie), PERENOL® F-60 (from Henkel), and FLUORAD® FC-430 (from 3M).

Pigments and soluble colorants may generally be selected for compositions according to this invention from materials established as satisfactory for similar uses. Examples of suitable materials include carbon black, phthalocyanine blue, phthalocyanine green, quinacridone red, hansa yellow, and/or benzidine yellow pigment, and the like.

The dispersions and coating compositions of the present invention can be applied in the conventional manner. For example, with respect to an autodeposition composition, ordinarily a metal surface is degreased and rinsed with water before applying the autodeposition composition. Conventional techniques for cleaning and degreasing the metal surface to be treated according to the invention can be used for the present invention. The rinsing with water can be performed by exposure to running water, but will ordinarily be performed by immersion for from 10 to 120 seconds, or preferably from 20 to 60 seconds, in water at ordinary ambient temperature.

Any method can be used for contacting a metal surface with the autodeposition composition of the present invention. Examples include immersion (e.g., dipping), spraying or roll coating, and the like. Immersion is usually preferred.

In one embodiment, the coating process according to this invention comprises the steps of contacting an object with an active metal surface with the aforedescribed autodeposition bath composition for a sufficient time to cause the formation of a film of the polymer of a pre-determined thickness on the metal surface, separating the coated metal surface from contact with the autodeposition bath composition, rinsing the coated metal surface to remove at least some of the absorbed but otherwise unadhered components of the bath composition from the more adherent portion of the coating and heating the rinsed surface to form a final film.

In one embodiment, contact between an active metal surface and the autodeposition bath compositions of this invention is for a time from about 0.5 to about 10 minutes or in another embodiment for a time from about 1 to about 3 minutes. Contact preferably is long enough to produce a final film thickness in one embodiment of from about 10 to about 50 microns and in another embodiment from about 18 to 25 microns.

Optionally, a reagent capable of causing additional desirable reactions in or modifications of the coated film may be included in the rinse used after cessation of contact between the wet coated surface and the bulk of the autodeposition bath composition. Such a reagent may also be brought into contact with the wet coated film after rinsing with water alone. Although the autodeposition bath compositions of the invention generally produce wet coated films that can be heated after simple rinsing with tap or deionized water to give good quality final films, the corrosion resistance of the cured coating may be further improved by rinsing with an aqueous solution comprising an alkaline earth metal compound such as calcium nitrate as described in copending applications Ser. No. 09/990,066, filed Nov. 21, 2001 and U.S. Pat. No. 6,410,092, both of which are incorporated herein by reference in their entirety.

Compositions employed in the present invention can be used in, for example, autodeposition compositions, for treating surfaces of iron, zinc, iron alloy and zinc alloy, and particularly steel portions of various components such as automobile sheet components and automobile components such as shock absorbers, jacks, leaf springs, suspension components and brackets, and the like, and components of furniture such as drawer rails, and the like. Autodeposition coatings are particularly well suited for indoor metal furniture that is subjected to wear and surface impacts, e.g., filing cabinets, filing shelves, desks, etc.

EXAMPLE 1

Preparation of an —COOH Functionalized Epoxy Resin

A 3.0-liter round bottom flask equipped with a condenser and agitator was charged with 574.7 parts of D.E.R® 331—bisphenol A diglycidyl ether (a product of Dow Chemical), 163.1 parts of Cardolite® NC-514—flexibilizing epoxy resin (a product of the Cardolite Corporation), 330.1 parts of Bisphenol A and 53.3 parts of methyl isobutyl ketone and heated to approximately 120° C. under inert gas purge. 1.7 parts of triphenylphosphine catalyst and 83.4 parts of methyl isobutyl ketone solvent were added to an addition funnel and mixed until the catalyst is dissolved. Once the contents of the reactor reached 120° C., the triphenylphosphine catalyst solution contained in the addition funnel was added to the reactor over a period of two hours. The reaction is exothermic and the temperature was allowed to rise to 136° C. The contents of the reactor were held at 135 to 140° C. for an additional five hours to achieve an epoxy equivalent weight (EEW) of 1482 g/eq. The contents of the reaction flask were cooled to 118° C. and then 101.5 parts of adipic acid were added to the reaction flask and the contents heated to 140° C. for two hours for the reaction to occur. Upon completion of the reaction, the contents of the reactor were cooled to 118° C. and 642.3 parts of methyl isobutyl ketone solvent was added and the material sampled for characterization:

| | |
|---|---|
| Percent Non-Volatiles: | 61.7 |
| EEW (g/eq. on NV) | 10,300 |
| Acid Value (g/eq. on NV) | 1,200 |

EXAMPLE 2

Processing the —COOH Functionalized Epoxy Resin into an Epoxy Resin Dispersion 866.80 parts of deionoized water and 18.56 parts of Rhodapex® CO-436 surfactant (a product of Rhodia Chimie Corporation) were added to an addition funnel and mixed to disperse the Rhodapex CO-436. To a 3.0-liter round bottom flask were added 407.00 parts of the —COOH functionalized epoxy resin of Example 1, 110.91 parts of D.E.R.® 661—epoxy resin (a product of Dow Chemical), 4.86 parts of ammonium hydroxide, 58.67 parts of Vestagon® B1530—blocked isocyanate crosslinker (a product of Huels), 8.44 parts of Modaflow® 2100—leveling agent (a product of Solutia, Inc.), 33.77 parts of Texanol®—coalescing solvent (a product of Eastman Chemical Company), and 240.45 parts of methyl isobutyl ketone. Under inert gas the mixture was heated to 30 to 40° C. and agitated for an hour to dissolve the Vestagon® B1530—crosslinker. To the contents of the 3.0-liter round bottom flask were added the contents of the addition funnel under vigorous agitation to form a pre-emulsion. The pre-emulsion was microfluidized through a M-110F Microfluidizer® emulsifer unit (a product of Microfluidics Corporation) at 5,000 to 6,000 psi. The mean particle size of the emulsion (dispersion) formed was 244 nm. The emulsion (dispersion) was transferred into a clean 3.0 liter round bottom flask equipped to distill the methyl isobutyl ketone/water azeotrope. The emulsion (dispersion) was distilled to a percent non-volatile of 34.2%. To 980.6 parts of the distilled unpigmented dispersion was added 28.33 parts of Aquablak® 255A (a product of Borden) to form a pigmented autodeposition dispersion.

EXAMPLE 3

Processing the Epoxy Resin Dispersion of Example 2 into a Coating Bath 675 parts deionized water were added to a 1.6-quart container. 75 parts of AUTOPHORETIC® 300 Starter (a product containing autodeposition accelerators and other components available from the Surface and Technologies Division of Henkel Corporation) was added and mixed thoroughly. Next, 261.47 parts of the pigmented epoxy resin dispersion of Example 2 was added to the container while mixing thoroughly without generating foam. Finally, sufficient water was added to bring the solution up to the operating level of 1,500 parts. The resulting bath was agitated for approximately 2 hours and bath parameters checked. Autophoretic Oxidizer®, Activator or Replenisher was added as necessary to adjust levels. The bath was allowed to equilibrate for 24 hours prior to coating parts.

| Operation and Control Conditions for Coating Bath of Example 3: | |
|---|---|
| Redox Value | 300 to 400 mV |
| LINEGUARD 101 Meter Reading | 150 to 300 microamperes |

| Operation and Control Conditions for Coating Bath of Example 3: | |
|---|---|
| Total Solids | 5.5 to 6.5% |
| Starter Titration | 22 to 32 ml |
| Temperature | 68° to 72° Fahrenheit |

EXAMPLE 4

Preparation of an Phosphate Ester Functionalized Epoxy Resin and Processing into a Dispersion 829.8 parts of PTD-3002-C (a Henkel Surface Technologies proprietary epoxy resin at 60.5% non-volatiles dissolved in MIBK) were charged to a 5.0-liter round bottom flask equipped with a condenser and agitator. The contents of the flask were then heated to approximately 100° C. 18.2 parts of superphosphoric acid were added over a 1-hour period while maintaining a temperature of approximately 100° C. under inert gas purge. The contents of the flask were held at approximately 100° C. for an additional three and one-half hours to achieve an epoxy equivalent weight (EEW) of 7,680 g/eq.

The contents of the flask were then cooled to 70° C. The following materials were then charged to the flask: 40.0 parts of deionized water; 23.7 parts of Rhodapex® CO-436 surfactant (a product of Rhodia Chimie Corporation); 98.0 parts of Vestagon® B1530—blocked isocyanate crosslinker (a product of Huels); 12.1 parts of Modaflow® 2100—leveling agent (a product of Solutia, Inc.); 48.3 parts of Texanol®—coalescing solvent (a product of Eastman Chemical Company); and 495.7 parts of methyl isobutyl ketone. The mixture was allowed to cool to 56° C. while being agitated under an inert gas purge for one hour to dissolve the Vestagon B1530.

Next 2.1 parts of ammonium hydroxide (23.9% assay) were added to the flask followed by 2,177.1 parts of deionoized water to form a pre-emulsion. The pre-emulsion was microfluidized through a M-110F Microfluidizer® emulsifer unit (a product of Microfluidics Corporation) at 10,000 psi. The mean particle size of the dispersion formed was 212 nm.

The dispersion was transferred into a clean 5.0 liter round bottom flask equipped to distill the methyl isobutyl ketone/water azeotrope. The dispersion was distilled to a percent non-volatile of 32.2%.

Next, to 653.0 parts of the unpigmented dispersion was added 28.33 parts of Aquablak® 255A (a product of Borden) to form a pigmented dispersion.

EXAMPLE 5

Processing the Pigmented Dispersion of Example 5 into a Coating Bath 675 parts deionized water were added to a 1.6-quart container. 75 parts of AUTOPHORETIC® 300 Starter (a product containing autodeposition accelerators and other components available from the Surface and Technologies Division of Henkel Corporation) was added and mixed thoroughly. Next, 279.32 parts of the pigmented dispersion of Example 4 was added to the container while mixing thoroughly without generating foam. Finally, sufficient water was added to bring the solution up to the operating level of 1,500 parts. The resulting bath was agitated for approximately 2 hours and bath parameters checked. Autophoretic Oxidizer®, Activator or Replenisher was added as necessary to adjust levels. The bath was allowed to equilibrate for 24 hours prior to coating parts.

| Operation and Control Conditions for Coating Bath of Example 5: | |
|---|---|
| Redox Value | 300 to 400 mV |
| LINEGUARD 101 Meter Reading | 150 to 300 microamperes |
| Total Solids | 5.5 to 6.5% |
| Starter Titration | 22 to 32 ml |
| Temperature | 68° to 72° Fahrenheit |

EXAMPLE 6

Processing Panels Through a Coating Bath Derived from the —COOH Functionalized Epoxy Resin The working coating bath described in example 3 was used to autodeposit coatings on ACT Cold Roll Steel panels, APR 11721, that have been cleaned and rinsed prior to immersing in the bath. The panels were immersed in the coating bath for 90-seconds under ambient conditions followed by a 30-second dwell, a 60-second ambient tap water rinse, a 30-second dwell, and a 60-second immersion in E1 Autophoretic® reaction rinse. (E1 autophoretic reaction rinse is a product containing calcium and ammonium nitrate components and is available from the Surface Technologies Division of Henkel Corporation). The panels were flash-dried in an oven for 5-minutes at 120° F. and then baked at 365° F. for 40 minutes.

| Cured Film Characteristics: | |
|---|---|
| Solvent Resistance (methyethyl ketone double rubs) | >200 |
| Reverse Impact Resistance (inch-pounds) | 160 |
| 504 hour NSS (ASTM B117, Scribed, total creep, mm) | 3.0 |
| Tape Adhesion (ASTM D3359, method B) | 5B |

EXAMPLE 7

Processing Panels Through a Coating Bath Derived from the Phosphate Ester Functionalized Epoxy Resin The working coating bath described in example 5 was used to autodeposit coatings on ACT Cold Roll Steel panels, APR 11721, that have been cleaned and rinsed prior to immersing in the bath. The panels were immersed in the coating bath for 90-seconds under ambient conditions followed by a 30-second dwell, a 60-second ambient tap water rinse, a 30-second dwell, and a 60-second immersion in E1 Autophoretic® reaction rinse. (E1 autophoretic reaction rinse is a product containing calcium and ammonium nitrate components and is available from the Surface Technologies Division of Henkel Corporation). The panels were flash-dried in an oven for 5-minutes at 120° F. and then baked at 365° F. for 40 minutes.

| Cured Film Characteristics: | |
|---|---|
| Solvent Resistance (methyethyl ketone double rubs) | >200 |
| Reverse Impact Resistance (inch-pounds) | 160 |

| -continued | |
|---|---|
| Cured Film Characteristics: | |
| 504 hour NSS (ASTM B117, Scribed, total creep, mm) | 4.3 |
| Tape Adhesion (ASTM D3359, method B) | 5B |

It will be apparent to those skilled in the art that various modifications and variations can be made in the compositions of the present invention and in the methods of preparing the anionic functional resin, the dispersion, and the coating bath without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An autodepositing epoxy resin dispersion comprising:

(a) water; and (b) at least one anionic functionalized epoxy resin derived from one or more epoxy resins having a molecular weight of at least about 2000 Daltons, wherein the at least one anionic functionalized epoxy resin has at least one anionic functional group selected from the group consisting of sulfonate, sulfate, phosphate, and phosphonate.

2. The autodepositing epoxy resin dispersion of claim 1, wherein the at least one anionic functionalized epoxy resin is derived from epoxy resin prepared by reacting a diglycidyl ether of a polyhydric phenol, a flexibilizing epoxy resin, and a chain extender containing at least two epoxy reactive groups selected from the group consisting of hydroxyl, carboxylic acid and carboxylic acid anhydride.

3. The autodepositing epoxy resin dispersion of claim 2, wherein the polyhydric phenol is bisphenol A.

4. The autodepositing epoxy resin dispersion of claim 2, wherein the flexibilizing epoxy resin is a glycidyl ether derived from cardanol.

5. The autodepositing epoxy resin dispersion of claim 2, wherein the chain extender is a polyhydric phenol.

6. The autodepositing epoxy resin dispersion of claim 1, wherein the autodepositing epoxy resin dispersion further comprises at least one surfactant.

7. The autodepositing epoxy resin dispersion of claim 1, wherein the autodepositing epoxy resin dispersion contains at least one further component selected from the group consisting of curing agents, auto deposition accelerators, colorants, coalescing solvents, and leveling agents.

8. The autodepositing epoxy resin dispersion of claim 1, wherein the at least one anionic functionalized epoxy resin is derived by reacting the epoxy resin with at least one functionalizing agent containing at least one anionic functional group selected from the group consisting of sulfonate, sulfate, phosphate, and phosphonate, and at least one functional group capable of reacting with epoxy groups and/or hydroxyl groups.

9. The autodepositing epoxy resin dispersion of claim 8, wherein the at least one functionalizing agent is the alkali metal salts of hydroxybenzenesulfonic acid.

10. An autodepositing coating composition comprising
(a) at least one autodepositing epoxy resin dispersion according to claim 1;
(b) water; and
(c) at least one auto deposition accelerator.

11. An autodepositing epoxy resin dispersion comprising:
(a) water; and
(b) at least one anionic functionalized epoxy resin in dispersed form, wherein the at least one anionic functionalized epoxy resin has at least one anionic functional group selected from the group consisting of sulfonate, sulfate, phosphate, and phosphonate and is derived from one or more epoxy resins conforming to the general chemical structure:

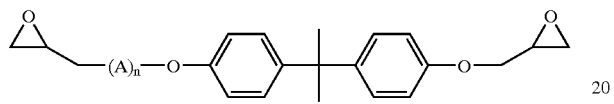

wherein A is

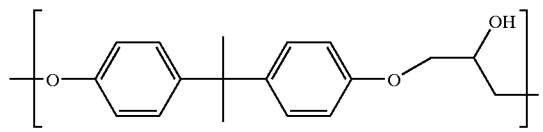

and n is an integer from 7 to 50.

12. An autodepositing coating composition comprising
(a) at least one autodepositing epoxy resin dispersion according to claim 11;
(b) water; and
(c) at least one autodeposition accelerator.

* * * * *

UNITED STATES PATENT AND TRADEMARK OFFICE
CERTIFICATE OF CORRECTION

PATENT NO. : 6,989,411 B2  Page 1 of 1
APPLICATION NO. : 10/292551
DATED : January 24, 2006
INVENTOR(S) : Brian D. Bammel et al.

It is certified that error appears in the above-identified patent and that said Letters Patent is hereby corrected as shown below:

<u>Title page,</u>
Item [56], References Cited, U.S. PATENT DOCUMENTS,
"3,791,431 A   2/1974 Hall et al.," should read
-- 3,791,431 A   2/1974 Steinbrecher et al. --.

Signed and Sealed this

Twenty-seventh Day of June, 2006

JON W. DUDAS
*Director of the United States Patent and Trademark Office*